(12) United States Patent
Tanaka (10) Patent No.: US 10,735,830 B2
(45) Date of Patent: Aug. 4, 2020

(54) TRANSMITTER

(71) Applicant: YOKOGAWA ELECTRIC CORPORATION, Musashino-shi, Tokyo (JP)

(72) Inventor: Takehisa Tanaka, Musashino (JP)

(73) Assignee: YOKOGAWA ELECTRIC CORPORATION, Musashino-shi, Tokyo (JP)

( * ) Notice: Subject to any disclaimer, the term of this patent is extended or adjusted under 35 U.S.C. 154(b) by 0 days.

(21) Appl. No.: 16/354,538

(22) Filed: Mar. 15, 2019

(65) Prior Publication Data

US 2019/0327540 A1 Oct. 24, 2019

(30) Foreign Application Priority Data

Apr. 19, 2018 (JP) .................. 2018-080902

(51) Int. Cl.
*G08C 19/02* (2006.01)
*H04Q 9/00* (2006.01)
*G08C 25/00* (2006.01)

(52) U.S. Cl.
CPC ..................... *H04Q 9/00* (2013.01)

(58) Field of Classification Search
None
See application file for complete search history.

(56) References Cited

U.S. PATENT DOCUMENTS

| | | | |
|---|---|---|---|
| 5,790,558 A | 8/1998 | Nakamura | |
| 2005/0168343 A1* | 8/2005 | Longsdorf | G01R 19/2509 340/664 |
| 2011/0010120 A1 | 1/2011 | Wehrs et al. | |
| 2012/0173952 A1* | 7/2012 | Kumar | H03M 13/091 714/758 |
| 2013/0325381 A1* | 12/2013 | Varnak | G01R 19/0092 702/64 |

FOREIGN PATENT DOCUMENTS

| | | |
|---|---|---|
| JP | H06210903 A | 8/1994 |
| JP | H11146553 A | 5/1999 |
| JP | H11261663 A | 9/1999 |
| JP | 2008537625 A | 9/2008 |
| JP | 2010003043 A | 1/2010 |
| JP | 2012533121 A | 12/2012 |
| JP | 2015060267 A | 3/2015 |

* cited by examiner

*Primary Examiner* — Curtis A Kuntz
*Assistant Examiner* — Jerold B Murphy
(74) *Attorney, Agent, or Firm* — Kenja IP Law PC (57) ABSTRACT

A transmitter includes a processor that connects to a sensor for outputting measurement data and outputs setting data based on the measurement data, a current controller that outputs output data based on the setting data from the processor, a current output interface that outputs a first current signal based on the output data from the current controller, and a current input interface that receives input of a second current signal and outputs input data based on the second current signal to the current controller. The current input interface outputs internal input data based on the first current signal to the current controller as the input data when receiving input of the first current signal as the second current signal. The current controller detects failure of the transmitter by comparing the setting data and the internal input data.

13 Claims, 5 Drawing Sheets

TRANSMITTER

CROSS-REFERENCE TO RELATED APPLICATION

The present application claims priority to and the benefit of Japanese Patent Application No. 2018-80902 filed Apr. 19, 2018, the entire contents of which are incorporated herein by reference.

TECHNICAL FIELD

The present disclosure relates to a transmitter.

BACKGROUND

Transmitters that have a current output circuit are known. For example, see patent literature (PTL) 1.

CITATION LIST

Patent Literature

PTL 1: JP201560267A

SUMMARY

A transmitter according to an embodiment includes a processor configured to connect to a sensor that outputs measurement data and to output setting data based on the measurement data. The transmitter includes a current controller configured to output output data based on the setting data from the processor. The transmitter includes a current output interface configured to output a first current signal based on the output data from the current controller. The transmitter includes a current input interface configured to receive input of a second current signal outputted by the current output interface and to output input data based on the second current signal to the current controller. The current input interface is configured to output internal input data based on the first current signal to the current controller as the input data when receiving input of the first current signal as the second current signal. The current controller is configured to detect failure of the transmitter in accordance with a comparison between the setting data and the internal input data.

DETAILED DESCRIPTION

To meet safety integrity levels, transmitters with better reliability or safety are desired.

In light of this point, it is an objective of the present disclosure to provide a transmitter that can improve reliability or safety.

A transmitter according to an embodiment includes a processor configured to connect to a sensor that outputs measurement data and to output setting data based on the measurement data. The transmitter includes a current controller configured to output output data based on the setting data from the processor. The transmitter includes a current output interface configured to output a first current signal based on the output data from the current controller. The transmitter includes a current input interface configured to receive input of a second current signal outputted by the current output interface and to output input data based on the second current signal to the current controller. The current input interface is configured to output internal input data based on the first current signal to the current controller as the input data when receiving input of the first current signal as the second current signal. The current controller is configured to detect failure of the transmitter in accordance with a comparison between the setting data and the internal input data. This configuration allows the current controller to control the current output interface and the current input interface regardless of an abnormality or failure in the processor, a reduction in capability due to increased load, or the like. Under such control by the current controller, the current signal can be continuously output regardless of the state of the processor. Consequently, the reliability or safety of the transmitter 1 can be improved. The load on the processor can also be reduced by virtue of the current controller judging whether an abnormality, failure, or the like has occurred in the transmitter. General-purpose processing by the processor is thus less likely to be obstructed. The specifications of the central processing unit (CPU) or the like constituting the processor can also be lowered. Therefore, costs can be reduced.

In a transmitter according to an embodiment, the output data and the input data may be outputted with an error detection code attached thereto. This configuration can improve the reliability or safety of data that is inputted and outputted. Errors may be detected on the basis of error detection codes by the processor or the current controller. The load on the processor can be reduced when the current controller detects errors on the basis of error detection codes. The transmitter can therefore operate more efficiently overall.

In a transmitter according to an embodiment, the current controller may be configured to output the output data again to the current output interface when the current output interface detects an error in the output data in accordance with the error detection code. This configuration can improve the reliability or safety of output data.

In a transmitter according to an embodiment, the current controller may be configured to issue a request to the current input interface to output the input data again when the current controller detects an error in the input data in accordance with the error detection code. This configuration can improve the reliability or safety of input data.

A transmitter according to an embodiment may be configured to connect to an external apparatus. The current output interface may be configured to output the first current signal to the external apparatus. The current input interface may include a selector configured to select one of the internal input data and external input data that is based on a current signal inputted from the external apparatus. The current input interface may be configured to output the one of the internal input data and the external input data selected by the selector to the current controller as the input data. When the transmitter includes the selector, the current controller can easily select and acquire the external input data based on the current signal from the external apparatus and the internal input data based on the first current signal. This configuration allows both data input from the external apparatus and detection of failure of the transmitter.

In a transmitter according to an embodiment, when the output data and the input data have different numbers of bits, the current controller is configured to align a most significant bit of the output data and a most significant bit of the input data and convert the output data and the input data to an identical number of bits. This configuration can reduce the scale of the circuit for comparing data.

In a transmitter according to an embodiment, the current controller may be configured to output a failure signal when detecting failure of the transmitter. The transmitter configured in this way can more reliably notify an external apparatus of the occurrence of an abnormality, failure, or the like in the transmitter. Consequently, the reliability or safety of the transmitter can be improved.

In a transmitter according to an embodiment, the current output interface may be configured to output a current signal including at least one of a current with a magnitude equal to or less than a first predetermined value and a current with a magnitude equal to or greater than a second predetermined value as the first current signal in accordance with the failure signal. The transmitter configured in this way can make the current signal burn out in accordance with the state of the transmitter.

The transmitter according to the present disclosure can improve reliability or safety.

A controller, constituted by a central processing unit (CPU) or the like, in a transmitter according to a comparative example controls a current output interface that outputs a current signal to an external circuit and a current input interface that acquires a current signal from the external circuit. To improve the reliability of the transmitter, it is desirable to detect failure of the current output interface. Failure can be detected in this case by connecting the current output and the current input and having the CPU compare the output value and the input value of the current signal. When the CPU detects failure, however, the CPU needs to execute a special program. A CPU with higher specifications may therefore be required.

Figure 1:
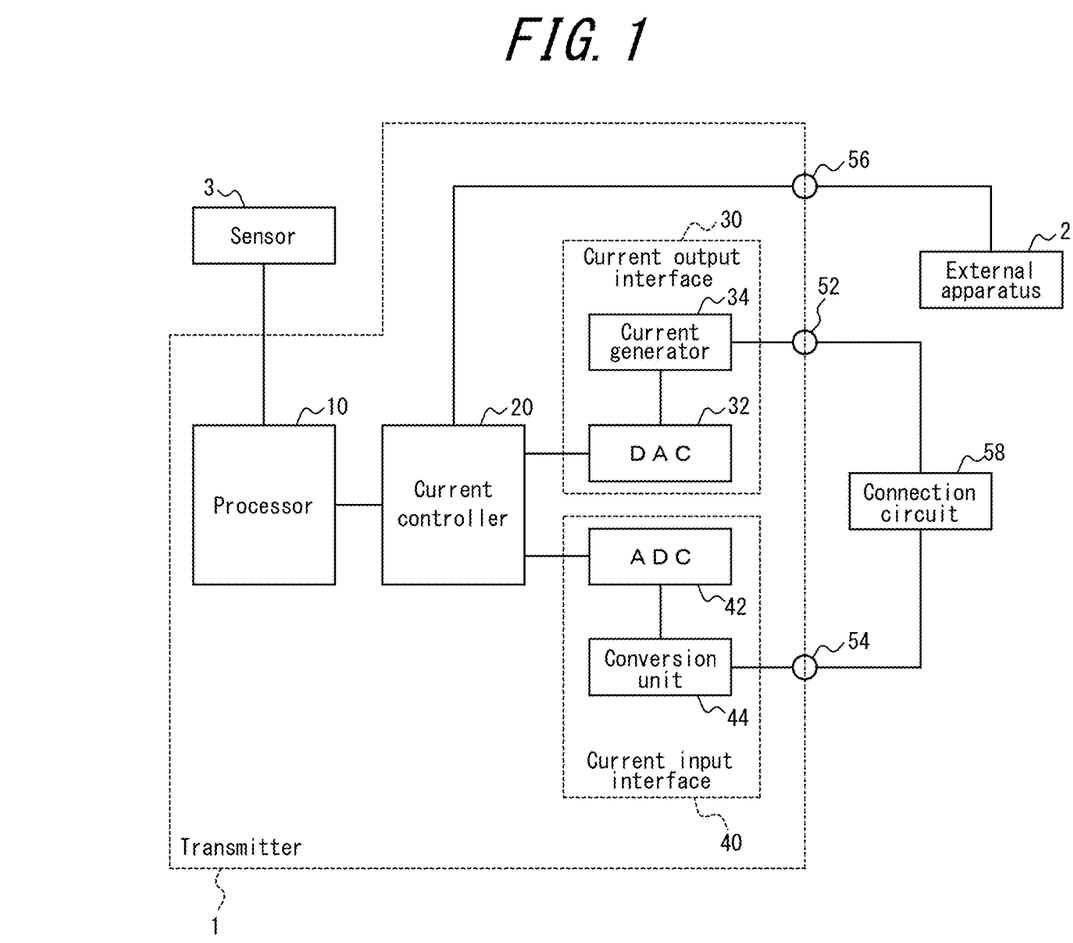
FIG. 1 is a block diagram illustrating an example configuration of a transmitter according to an embodiment.

A transmitter 1 according to an embodiment includes a processor 10, a current controller 20, a current output interface 30, and a current input interface 40, as illustrated in FIG. 1. The processor 10 and the current controller 20 are connected to each other and can input and output data. The current controller 20 is connected to the current output interface 30 and the current input interface 40. The processor 10 is connected to the sensor 3 provided outside of the transmitter 1. The transmitter 1 may include the sensor 3.

The current output interface 30 and the current input interface 40 are each connected to a connection circuit 58. In other words, the current output interface 30 and the current input interface 40 are connected to each other via the connection circuit 58. The transmitter 1 may further include an output terminal 52. In this case, the current output interface 30 may be connected to the connection circuit 58 at the output terminal 52. The transmitter 1 may further include an input terminal 54. In this case, the current input interface 40 may be connected to the connection circuit 58 at the input terminal 54. The connection circuit 58 may simply be wiring or may include a resistor. The connection circuit 58 allows current flowing from the output terminal 52 to flow to the input terminal 54 at the same magnitude. In other words, the current outputted by the current output interface 30 is inputted as is to the current input interface 40 by virtue of the output terminal 52 and the input terminal 54 being connected via the connection circuit 58.

The current output interface 30 may be connected to an external apparatus 2. In this case, the current output interface 30 can output a current signal to the external apparatus 2. The current input interface 40 may be connected to the external apparatus 2. In this case, the current input interface 40 can receive input of a current signal from the external apparatus 2. The transmitter 1 may further include a notification terminal 56. In this case, the current controller 20 may be connected to the external apparatus 2 at the notification terminal 56.

The transmitter 1 outputs a current signal based on measurement data acquired from the sensor 3. The external apparatus 2 can acquire the measurement data of the sensor 3 on the basis of the current signal acquired from the transmitter 1. The external apparatus 2 can also output information related to a correction value of the measurement data or the like to the transmitter 1 as a current signal. On the basis of the current signal acquired from the external apparatus 2, the transmitter 1 can acquire the information related to a correction value of the measurement data or the like. Data related to a correction value of the measurement data may be temperature data, pressure data, or the like acquired by the external apparatus 2.

When a system including the transmitter 1 is used for a purpose for which safety is particularly required (safety instrumented system), acquisition of a safety integrity level (SIL) may be required. To acquire an SIL, the transmitter 1 is required to have a configuration for detecting an abnormality or failure of the transmitter 1 and for warning a high-level system. It is particularly important to provide a configuration for monitoring the current output (loop output) in a control loop and for confirming a lack of abnormalities. An improvement in the reliability or safety of the transmitter 1 is desired for satisfying the SIL requirements.

The processor 10 acquires measurement data from the sensor 3 and processes the measurement data. The processor 10 outputs control information to the current controller 20 on the basis of the measurement data. The control information for controlling the current controller 20 is also referred to as setting data. The processor 10 may communicate with the sensor 3 in accordance with standards such as RS485.

The processor 10 may be formed by a general-purpose integrated circuit, such as a CPU. The processor 10 may implement various functions of the transmitter 1 by executing predetermined programs. The processor 10 may include a memory. The transmitter 1 may include a memory as a separate component from the processor 10. The memory may store various information used for operations of the transmitter 1, programs for implementing the functions of the transmitter 1, and the like. The memory may function as a working memory of the processor 10. The memory may, for example, be a semiconductor memory.

The current controller 20 outputs control information to the current output interface 30. The current output interface 30 outputs a current signal based on the control information. The control information for controlling output of the current signal in the current output interface 30 is also referred to as output data. The transmitter 1 may further include an output terminal 52 for the current output interface 30 to output the current signal to an external destination. The transmitter 1 may be connected to the external apparatus 2 at the output terminal 52. When the current output interface 30 is connected to the external apparatus 2, the external apparatus 2 can acquire data specified by a current signal from the transmitter 1.

The current controller 20 may be configured by an integrated circuit specially designed for particular processing, such as a field-programmable gate array (FPGA). The current controller 20 may include the same, or a similar, type of memory as the processor 10.

The current output interface 30 may include a D/A converter (DAC) 32 and a current generator 34. The current output interface 30 acquires the output data from the current controller 20 as a digital signal. The DAC 32 converts the output data to an analog signal. On the basis of the output data converted to an analog signal, the current generator 34 generates a current signal to output from the output terminal 52. In other words, the current output interface 30 can output a current signal based on the output data. The current signal that the current output interface 30 outputs on the basis of the output data is also referred to as a first current signal. The first current signal may, for example, be an analog current signal of 4 mA to 20 mA. The DAC 32 and the current generator 34 may be formed integrally.

The processor 10, the current controller 20, and the current output interface 30 convert the measurement data acquired from the sensor 3 into a current signal and output the current signal to the external apparatus 2. In other words, the transmitter 1 transmits measurement data to the external apparatus 2 by causing the current output interface 30 to output a current signal based on the measurement data.

The current input interface 40 receives input of a current signal. The current signal received by the current input interface 40 as input is also referred to as a second current signal. The current input interface 40 generates data based on the second current signal. The data based on the second current signal is also referred to as input data. The current input interface 40 outputs the input data to the current controller 20. The current controller 20 acquires the input data from the current input interface 40. The transmitter 1 may further include an input terminal 54 for inputting the current signal to the current input interface 40. The transmitter 1 may be connected to the external apparatus 2 at the input terminal 54. When the current input interface 40 is connected to the external apparatus 2, the transmitter 1 can acquire input data from the external apparatus 2.

The current input interface 40 may include an A/D converter (ADC) 42 and a conversion unit 44. The current input interface 40 receives input of a current signal at the input terminal 54. The conversion unit 44 converts the current signal inputted to the input terminal 54 into a voltage signal. The voltage signal converted from the current signal by the conversion unit 44 can be considered an analog signal. The conversion unit 44 may, for example, include a circuit for converting the current flowing through electrical resistance into voltage at the ends of the electrical resistance or include a circuit formed by an operational amplifier or the like. The ADC 42 converts the voltage signal converted from a current signal in the conversion unit 44 to a digital signal and outputs the digital signal to the current controller 20. In other words, the current input interface 40 can output, to the current controller 20, input data of the digital signal. The ADC 42 and the conversion unit 44 may be formed integrally.

The current controller 20 outputs the input data acquired from the current input interface 40 to the processor 10. In other words, the processor 10 acquires input data from the current input interface 40 via the current controller 20. The processor 10 processes the measurement data on the basis of the acquired input data. For example, the input data may include data related to a correction value of the measurement data. The processor 10 may correct the measurement data on the basis of the data related to a correction value included in the input data. The processor 10 may generate the setting data to output to the current controller 20 on the basis of the corrected measurement data.

Input and output of data between the current controller 20 on the one hand and the current output interface 30 and current input interface 40 on the other may be implemented by digital communication, such as the serial peripheral interface (SPI).

The current signal for the transmitter 1 to transmit measurement data to the external apparatus 2 may be an instrumentation reference signal. The instrumentation reference signal may be a current signal controlled to have a magnitude in a predetermined range equal to or greater than a first predetermined value and equal to or less than a second predetermined value. The first predetermined value may, for example, be 4 mA. The second predetermined value may, for example, be 20 mA.

The external apparatus 2 may be a device for monitoring the measurement data of the sensor 3 or a device such as a data logger for collecting the measurement data of the sensor 3. The external apparatus 2 may be a device that manages the transmitter 1 or that monitors the state of the transmitter 1.

The sensor 3 may, for example, be a pH sensor. In this case, the transmitter 1 that converts the measurement data of the pH sensor to an instrumentation reference signal is also referred to as a liquid converter or a converter. The sensor 3 is not limited to being a pH sensor and may be any of a variety of other devices.

The current output interface 30 might not be able to output the current signal based on the setting data from the processor 10 via the output terminal 52 for reasons such as a circuit abnormality. The current input interface 40 might not be able to receive the current signal inputted to the input terminal 54 or might not be able to output, to the current controller 20, the data based on the current signal inputted to the input terminal 54 for reasons such as a circuit abnormality.

When the first current signal is input to the current input interface 40 as the second current signal, the current input interface 40 generates input data based on the first current signal. The input data based on the first current signal is also referred to as internal input data. The internal input data is assumed to be the same data as the setting data, or data that differs from the setting data by less than a predetermined value, when no abnormality, failure, or the like has occurred in the transmitter 1. In other words, it is assumed that when the absolute value of the difference between the internal input data and the setting data is less than a predetermined value, no abnormality, failure, or the like has occurred in the transmitter 1.

Conversely, when the absolute value of the difference between the internal input data and the setting data is equal to or greater than a predetermined value, it is assumed that an abnormality, failure, or the like has occurred in the transmitter 1. For example, the absolute value of the difference between the setting data and the internal input data may become equal to or greater than the predetermined value when the output data outputted from the current controller 20 to the current output interface 30 or the input data outputted from the current input interface 40 to the current controller 20 includes an error. The absolute value of the difference between the setting data and the internal input data may become equal to or greater than the predetermined value when the current signal that the current output interface 30 actually outputs and the current signal that should be outputted on the basis of the setting data are different. The absolute value of the difference between the setting data and the internal input data may become equal to or greater than the predetermined value when the input data generated by the current input interface 40 differs from the data based on the current signal actually inputted to the current input interface 40.

The current controller 20 can judge, in accordance with a comparison between the setting data and the internal input data, whether an abnormality, failure, or the like has occurred in the transmitter 1. The current controller 20 may make the judgment in accordance with the difference between the setting data and the internal input data. In this case, the current controller 20 may judge that an abnormality, failure, or the like has occurred in the transmitter 1 when the setting data and the internal input data differ. The current controller 20 may judge that an abnormality, failure, or the like has occurred in the transmitter 1 when the absolute value of the difference between the setting data and the internal input data is equal to or greater than a predetermined value.

If an abnormality, failure, or the like occurs in the processor 10, the processor 10 might not be able to output the setting data to the current controller 20. Even when the current controller 20 cannot acquire new setting data from the processor 10, the current controller 20 may output the output data based on the last acquired setting data to the current output interface 30. The transmitter 1 configured in this way can continue to output the current signal.

The processor 10 may output setting data not based on the measurement data as the setting data for detecting the occurrence of an abnormality, failure, or the like in the transmitter 1. With this approach, the transmitter 1 can detect the occurrence of an abnormality, failure, or the like regardless of whether the processor 10 has acquired measurement data.

When the current controller 20 judges that an abnormality, failure, or the like has occurred in the transmitter 1, the current controller 20 may output a signal to the external apparatus 2 to provide notification of the abnormality, failure, or the like in the transmitter 1. The signal to provide notification of the abnormality, failure, or the like in the transmitter 1 is also referred to as a failure signal or FAIL signal.

When the current controller 20 detects an abnormality, failure, or the like of the transmitter 1, the current controller 20 may output the failure signal to the external apparatus 2 from the notification terminal 56. The external apparatus 2 can recognize that an abnormality, failure, or the like has occurred in the transmitter 1 by acquiring the failure signal from the transmitter 1. On the basis of the failure signal, the external apparatus 2 may notify a DCS user, for example, of the abnormality, failure, or the like. The external apparatus 2 may provide the notification by various means, such as sounding a buzzer or turning on a revolving light. The wiring for connecting the current controller 20 and the external apparatus 2 may include a relay. The current controller 20 may control output of the failure signal to the external apparatus 2 by controlling opening and closing of the relay.

When the current output interface 30 is connected to the external apparatus 2, the current controller 20 may notify the external apparatus 2 that an abnormality, failure, or the like has occurred in the transmitter 1 by causing the current output interface 30 to output a current having a magnitude outside of the range of current included in instrumentation reference signals. In this case, the current controller 20 may cause the current output interface 30 to output a current having a magnitude less than the first predetermined value or a magnitude exceeding the second predetermined value. The current controller 20 may, for example, cause the current output interface 30 to output a current having a magnitude of less than 4 mA or a magnitude exceeding 20 mA. The magnitude of the current that the current controller 20 causes the current output interface 30 to output may, for example, be 0 mA, 3.6 mA, 20.4 mA, or the like. The magnitude is not limited to these examples and may be any of various values. The current output interface 30 may output current having a magnitude of less than the first predetermined value via burn down. The current output interface 30 may output current having a magnitude exceeding the second predetermined value via burn up.

The current controller 20 may output the failure signal to the external apparatus 2 and also output a signal, to the current output interface 30, instructing the current output interface 30 to set the magnitude of the current being output to 0 mA. The signal instructing that the magnitude of the output current be set to 0 mA is also referred to as a clear signal. In response to the clear signal, the current output interface 30 controls the magnitude of the current being output to become 0 mA. Consequently, the external apparatus 2 can recognize that an abnormality, failure, or the like has occurred in the transmitter 1.

When the current controller 20 controls the output of the failure signal by opening and closing a relay, the wiring for outputting the clear signal from the current controller 20 may branch off from the wiring for connecting the current controller 20 and the relay. In this case, the current controller 20 can output the failure signal by opening and closing a relay in combination with output of the clear signal to the current output interface 30. The current controller 20 configured in this way can more reliably notify the external apparatus 2 of the occurrence of an abnormality, failure, or the like in the transmitter 1. Consequently, the reliability or safety of the transmitter 1 can be improved.

In the transmitter 1 according to the present embodiment, the first current signal is input into the current input interface 40 as is as the second current signal by virtue of the output terminal 52 and the input terminal 54 being connected by the connection circuit 58. This configuration allows the current input interface 40 to output the internal input data based on the first current signal to the current controller 20. Consequently, the current controller 20 can acquire the internal input data and judge, in accordance with a comparison between the setting data and the internal input data, whether an abnormality, failure, or the like has occurred in the transmitter 1.

The transmitter 1 according to the present embodiment includes the processor 10, which executes measurement data processing and general-purpose processing, and the current controller 20, which judges whether an anomaly, failure, or the like has occurred in the transmitter 1 while controlling the current output interface 30 and the current input interface 40. This configuration can reduce the load of the processor 10. For example, the number of processes executed by the processor 10 can be reduced. Furthermore, the free space in the memory of the processor 10 can be increased by the omission of a program for the processor 10 to execute judgment processing. General-purpose processing by the processor 10 is thus less likely to be obstructed. The specifications of the CPU or the like constituting the processor 10 can also be lowered. Therefore, costs can be reduced.

In the transmitter 1 according to the present embodiment, the current controller 20 can control the current output interface 30 and the current input interface 40 regardless of an abnormality or failure in the processor 10, a reduction in capability due to increased load, or the like. Output of the current signal can be continued with this configuration. Consequently, the reliability or safety of the transmitter 1 can be improved.

Figure 2:
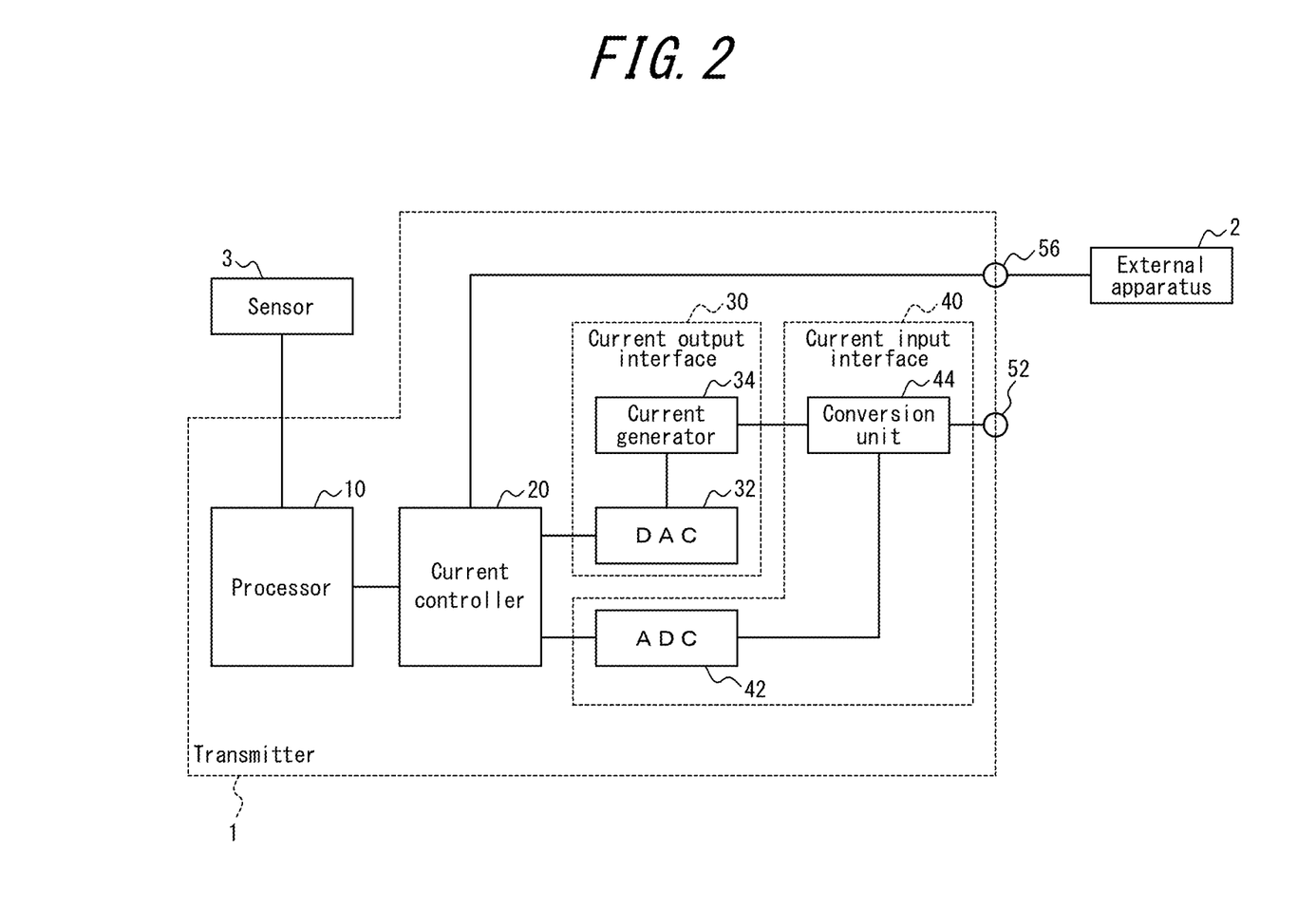
FIG. 2 is a block diagram illustrating an example configuration for internally converting an outputted current signal to voltage.

As illustrated in FIG. 2, the conversion unit 44 may be connected between the current output interface 30 and the output terminal 52. The output terminal 52 terminates without being connected to another apparatus, such as the external apparatus 2. In this case, the conversion unit 44 converts the first current signal to a voltage signal and outputs the voltage signal to the ADC 42. The output terminal 52 may be connected to the external apparatus 2. In this case, the conversion unit 44 may convert the first current signal to a voltage signal and output the voltage signal to the ADC 42 while outputting the first current signal as is to the external apparatus 2 from the output terminal 52. The ADC 42 outputs data based on the voltage signal acquired from the conversion unit 44 to the current controller 20. In other words, the ADC 42 outputs internal input data based on the first current signal to the current controller 20. The current controller 20 can acquire the internal input data and judge, in accordance with a comparison between the setting data and the internal input data, whether an abnormality, failure, or the like has occurred in the transmitter 1. When the conversion unit 44 is connected between the current output interface 30 and the output terminal 52, the current controller 20 can acquire the internal input data without the output terminal 52 and the input terminal 54 being connected by the connection circuit 58 or the like. This makes it easier for the transmitter 1 to judge whether failure has occurred. Consequently, the reliability or safety of the transmitter 1 can be improved.

Figure 3:
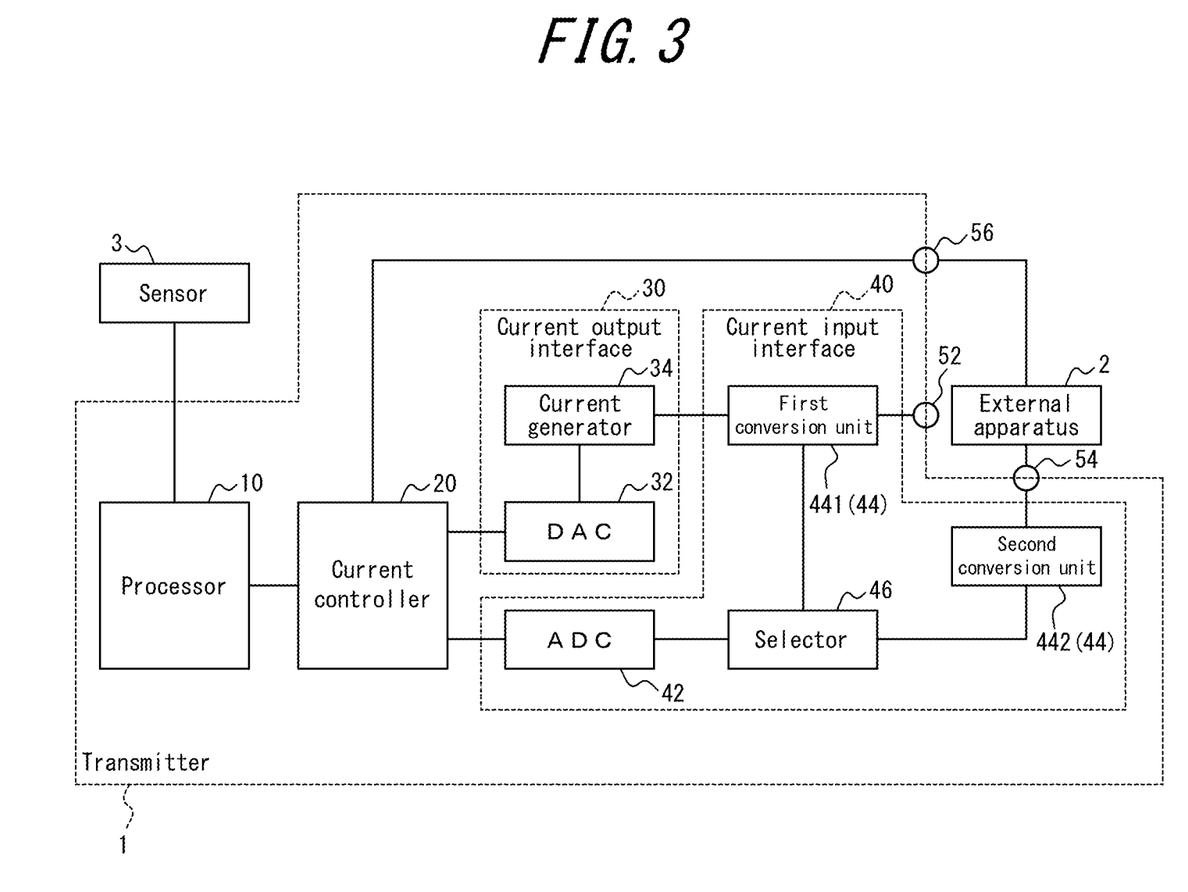
FIG. 3 is a block diagram illustrating an example configuration for selecting and acquiring a voltage yielded by converting a current signal outputted by the transmitter and a voltage yielded by converting a current signal outputted by an external apparatus.

As illustrated in FIG. 3, the current input interface 40 may include a first conversion unit 441, a second conversion unit 442, and a selector 46. The first conversion unit 441 and the second conversion unit 442 may be configured in an identical or similar way to the conversion unit 44 illustrated in FIGS. 1 to 3 and may convert a current signal into a voltage signal. The selector 46 acquires the voltage signals from the first conversion unit 441 and the second conversion unit 442. The selector 46 selects one of the voltage signal acquired from the first conversion unit 441 and the voltage signal acquired from the second conversion unit 442 and outputs the selected voltage signal to the ADC 42.

When the selector 46 outputs the voltage signal acquired from the first conversion unit 441 to the ADC 42, the first conversion unit 441 and the ADC 42 can function in an identical or similar way to the conversion unit 44 and the ADC 42 illustrated in FIG. 2. In this case, the current input interface 40 can output the internal input data based on the first current signal to the current controller 20. Consequently, even if the output terminal 52 and the input terminal 54 are not connected, the current controller 20 can acquire the internal input data and judge, in accordance with a comparison between the output data and the internal input data, whether an abnormality, failure, or the like has occurred in the transmitter 1.

When the selector 46 outputs the voltage signal acquired from the second conversion unit 442 to the ADC 42, the current input interface 40 outputs data based on the current signal acquired from the external apparatus 2 via the input terminal 54 to the current controller 20 as the input data. The data based on the current signal output by the external apparatus 2 is also referred to as external input data. In other words, the current controller 20 can acquire external input data as the input data.

When the transmitter 1 includes the selector 46, the current controller 20 can easily select and acquire the external input data based on the current signal from the external apparatus 2 and the internal input data based on the first current signal. This configuration allows both data input from the external apparatus 2 and detection of failure of the transmitter 1.

The current controller 20 in the transmitter 1 according to the present embodiment can easily judge whether an abnormality, failure, or the like has occurred in the transmitter 1 by acquiring the internal input data and comparing it with the setting data.

The setting data, the output data, and the input data are assumed to be inputted and outputted as n-bit binary digital signals (where n is a natural number). In this case, the setting data, the output data, and the input data can have values in a range from 0 to $2^n-1$ (where A represents exponentiation). In other words, the minimum value of these data is zero, and the maximum value is $2^n-1$.

The processor 10 generates the setting data as control information for causing the current output interface 30 to output current with a magnitude based on the measurement data. The processor 10 then outputs the setting data to the current controller 20. The minimum and maximum values of the setting data can be associated with the minimum and maximum values of the magnitude of current that the current output interface 30 is caused to output. For example, the processor 10 outputs $2^n-1$ as the setting data when causing the current output interface 30 to output the maximum current and outputs 0 as the setting data when causing the current output interface 30 to output the minimum current.

The current controller 20 generates output data based on the setting data acquired from the processor 10 and outputs the output data to the current output interface 30. The current controller 20 may output the setting data as is to the current output interface 30 as the output data.

On the basis of the output data, the current output interface 30 controls the magnitude of the current that is output. The minimum and maximum values of the output data can be associated with the minimum and maximum values of the magnitude of current that the current output interface 30 outputs. For example, the current output interface 30 outputs the maximum current when acquiring $2^n-1$ as the output data and outputs the minimum current when acquiring 0 as the output data.

On the basis of the output data, the current output interface 30 controls the magnitude of the current that is output. Depending on the characteristics of the current output interface 30, the magnitude of the current actually outputted by the current output interface 30 may differ from the magnitude of the current that the processor 10 was attempting to cause the current output interface 30 to output. The current controller 20 may calibrate the setting data on the basis of the characteristics of the current output interface 30 and output the result of calibration to the current output interface 30 as the output data.

The characteristics of the current output interface 30 may include the relationship between the output data acquired by the current output interface 30 and the actual measurement of the current outputted from the current output interface 30. The current controller 20 may calibrate the setting data on the basis of the characteristics of the current output interface 30. The relationship between the output data and the actual measurement may be expressed as a table, a function, or the like. When the relationship between the output data and the actual measurement is expressed as a linear function, for example, the current controller 20 may set a ZERO value corresponding to the intercept and a GAIN value corresponding to the slope of the linear function. The current controller 20 may calibrate the setting data to generate the output data by executing a product-sum operation based on the ZERO value and the GAIN value.

The current input interface 40 generates the input data on the basis of the magnitude of the current for which input was received. The current input interface 40 may set the minimum and maximum values of the magnitude of current for which input is received. The minimum and maximum values of the input data can be associated with the minimum and maximum values of the magnitude of current for which the current input interface 40 receives input. For example, the current input interface 40 may generate $2^n-1$ as the input data when the magnitude of the current for which input was received matches the set maximum value and may generate 0 as the input data when the magnitude of the current for which input was received matches the set minimum value.

The current controller 20 acquires the input data from the current input interface 40. The current controller 20 may output the acquired input data as is to the processor 10. Depending on the characteristics of the current input interface 40, the input data generated by the current input interface 40 may differ from the data associated with the magnitude of the current actually input to the current input interface 40. On the basis of the characteristics of the current input interface 40, the current controller 20 may calibrate the input data acquired from the current input interface 40. The current controller 20 may output the result of calibration to the processor 10 as the input data.

The characteristics of the current input interface 40 may include the relationship between the actual measurement of the current inputted to the current input interface 40 and the input data generated by the current input interface 40. The current controller 20 may calibrate the input data on the basis of the characteristics of the current input interface 40. The relationship between the actual measurement and the input data may be expressed as a table, a function, or the like. When the relationship between the measured value and the input data is expressed as a linear function, for example, the current controller 20 may set the intercept of the linear function to a ZERO value and the slope of the linear function to a GAIN value. The current controller 20 may calibrate the input data by executing a product-sum operation based on the ZERO value and the GAIN value.

The processing related to data calibration may include particular processing, such as pattern-based calculation. The current controller 20 may be configured by an FPGA or the like specialized for particular processing and may thereby be capable of executing processing related to data calibration more efficiently than the processor 10. The load of the processor 10 can be reduced by having the current controller 20 execute the processing related to data calibration. The transmitter 1 can therefore operate more efficiently overall.

If the current outputted by the current output interface 30 on the basis of the setting data from the processor 10 were to be inputted as is to the current input interface 40, the input data acquired by the processor 10 could be the same as the setting data. In other words, the internal input data could match the setting data. When an abnormality, failure, or the like has not occurred in the transmitter 1, the current controller 20 can cause the setting data and the input data to match by calibrating at least one of the setting data acquired from the processor 10 and the input data acquired from the current input interface 40. Conversely, when the setting data and the input data do not match, or when the difference between the setting data and the input data is equal to or greater than a predetermined value, the current controller 20 can judge that an abnormality, failure, or the like has occurred in the transmitter 1. The current controller 20 may, for example, judge whether the difference between the setting data and the input data is less than a predetermined value when the first current signal is inputted as is to the current input interface 40 as the second current signal. The current controller 20 may judge that an abnormality, failure, or the like has not occurred in the transmitter 1 when the difference between the setting data and the input data is less than a predetermined value. The current controller 20 may judge that an abnormality, failure, or the like has occurred in the transmitter 1 when the difference between the setting data and the input data is equal to or greater than a predetermined value. The predetermined value used for judgment is also referred to as a failure judgment value or a judgment value. The failure judgment value may be set regardless of the value of the setting data or on the basis of the value of the setting data. The failure judgment value may, for example, be set to the product of the value of the setting data and a predetermined coefficient. Non-limiting examples of the predetermined coefficient include 3% and 5%.

The current controller 20 may output the failure signal to the external apparatus 2 when judging that an abnormality, failure, or the like has occurred in the transmitter 1. The current controller 20 and the external apparatus 2 may be connected by a signal line for outputting the failure signal. The current controller 20 may assert the signal line for outputting the failure signal when judging that an abnormality, failure, or the like has occurred in the transmitter 1. The current controller 20 may negate the signal line for outputting the failure signal when judging that an abnormality, failure, or the like has not occurred in the transmitter 1. The state in which the signal line is asserted is also referred to as an on state. The state in which the signal line is negated is also referred to as an off state. A voltage equal to or greater than a predetermined threshold may be applied to the signal line in the on state, and a voltage less than the predetermined threshold may be applied in the off state. A voltage less than a predetermined threshold may be applied to the signal line in the on state, and a voltage equal to or greater than the predetermined threshold may be applied in the off state.

It is assumed below that the setting data, the output data, and the input data are represented as 16-bit binary numbers. In this case, the minimum and maximum values are represented as 0x0000 and 0xFFFF respectively. The minimum and maximum values of the current outputted by the current output interface 30 are assumed to be 0 mA and 24 mA respectively. The minimum and maximum values set as the magnitude of current for which the current input interface 40 receives input are assumed to be 0 mA and 24 mA respectively.

When the current controller 20 acquires 0x0000 and 0xFFFF as the setting data, the current controller 20 calibrates the setting data so that the magnitudes of current outputted by the current output interface 30 become 0 mA and 24 mA respectively and outputs the result of calibration to the current output interface 30 as output data. When the magnitudes of current inputted to the current input interface 40 are 0 mA and 24 mA, the current controller 20 calibrates the input data to become 0x0000 and 0xFFFF respectively and outputs the result of calibration to the processor 10.

For example, suppose that the processor 10 outputs 0x1554 as the setting data. The setting data represented as 0x1554 corresponds to causing the current output interface 30 to output a current of 2 mA. Suppose that the current controller 20 has set 0x2000 as the failure judgment value. Also suppose that the current controller 20 outputs 0x2AA8 to the processor 10 as the input data. The input data represented as 0x2AA8 corresponds to a current of 4 mA being inputted to the current input interface 40.

Under these assumptions, the difference between the setting data and the input data is 0x1554, which is less than the failure judgment value. The current controller 20 judges that an abnormality, failure, or the like has not occurred in the transmitter 1 on the basis of the difference between the setting data and the input data being less than the failure judgment value.

If the current controller 20 were to output 0x3FFC to the processor 10 as the input data, the difference between the setting data and the input data would be 0x2AA8, which is equal to or greater than the failure judgment value. The current controller 20 judges that an abnormality, failure, or the like has occurred in the transmitter 1 on the basis of the difference between the setting data and the input data being equal to or greater than the failure judgment value.

The comparison of the setting data and the input data may include particular processing, such as pattern-based calculation. The current controller 20 may be configured by an FPGA or the like specialized for particular processing and may thereby be capable of executing processing related to data comparison more efficiently than the processor 10. The load of the processor 10 can be reduced by having the current controller 20 execute the processing related to data comparison. The transmitter 1 can therefore operate more efficiently overall.

As a result of the current controller 20 calibrating the setting data and the input data, the minimum and maximum values of the digital signal are associated with the minimum and maximum values of the current signal. In other words, by calibrating the setting data and the input data, the current controller 20 can be considered to cause the scale of the digital signals associated with the current signals to match. With this approach, the current controller 20 can process setting data and input data as digital signals associated with current signals, regardless of the conversion characteristics of the DAC 32 or the ADC 42. The current controller 20 can therefore more accurately judge whether an abnormality, failure, or the like has occurred in the transmitter 1.

The DAC 32 acquires the output data from the current controller 20 when the current output interface 30 includes the DAC 32. When the output data outputted by the current controller 20 is an n-bit digital signal, the DAC 32 may be configured to convert the n-bit digital signal to an analog signal.

The DAC 32 may be configured to convert an m-bit (where m is a natural number, and m≠n) digital signal to an analog signal. When m<n, the DAC 32 may convert an m-bit digital signal, formed by truncating the least significant (n−m) bits of the n-bit input data to retain the most significant m bits, to an analog signal. When m>n, the DAC 32 may convert an m-bit digital signal, formed by appending (n−m) 0 bits as the least significant bits to the n-bit output data, to an analog signal.

When the current input interface 40 includes the ADC 42, the current controller 20 acquires the input data from the ADC 42. The ADC 42 may be configured to convert the analog signal acquired from the conversion unit 44 to an n-bit digital signal and output the n-bit digital signal to the current controller 20. The ADC 42 may be configured to convert an analog signal to a k-bit (where k is a natural number, and k≠n) digital signal and output the k-bit digital signal to the current controller 20 as the input data. When k<n, the current controller 20 may consider an n-bit digital signal formed by appending (n−k) 0 bits as the least significant bits to the k-bit input data to be the input data. When k>n, the current controller 20 may consider an n-bit digital signal, formed by truncating the least significant (k−n) bits of the k-bit input data to retain the most significant n bits, to be the input data. The current controller 20 may compare the n-bit setting data and the n-bit input data.

The current controller 20 may compare the n-bit setting data acquired from the processor 10 and the k-bit input data acquired from the ADC 42. When n≠k, the current controller 20 may align the number of bits and then compare the setting data and the input data. For example, when n>k, the current controller 20 may compare the k-bit input data with a k-bit digital signal formed by truncating the least significant (n−k) bits of the n-bit setting data to retain the most significant k bits. The current controller 20 may also compare the n-bit setting data and an n-bit digital signal formed by appending (n−k) 0 bits as the least significant bits to the k-bit input data. When n<k, the current controller 20 may compare the setting data and the input data in a similar way to when n>k.

When the setting data and the input data have different numbers of bits, the current controller 20 can compare the setting data and the input data by aligning the most significant bit of each data. This configuration can reduce the scale of the circuit for implementing the comparison function in the current controller 20.

Figure 4:
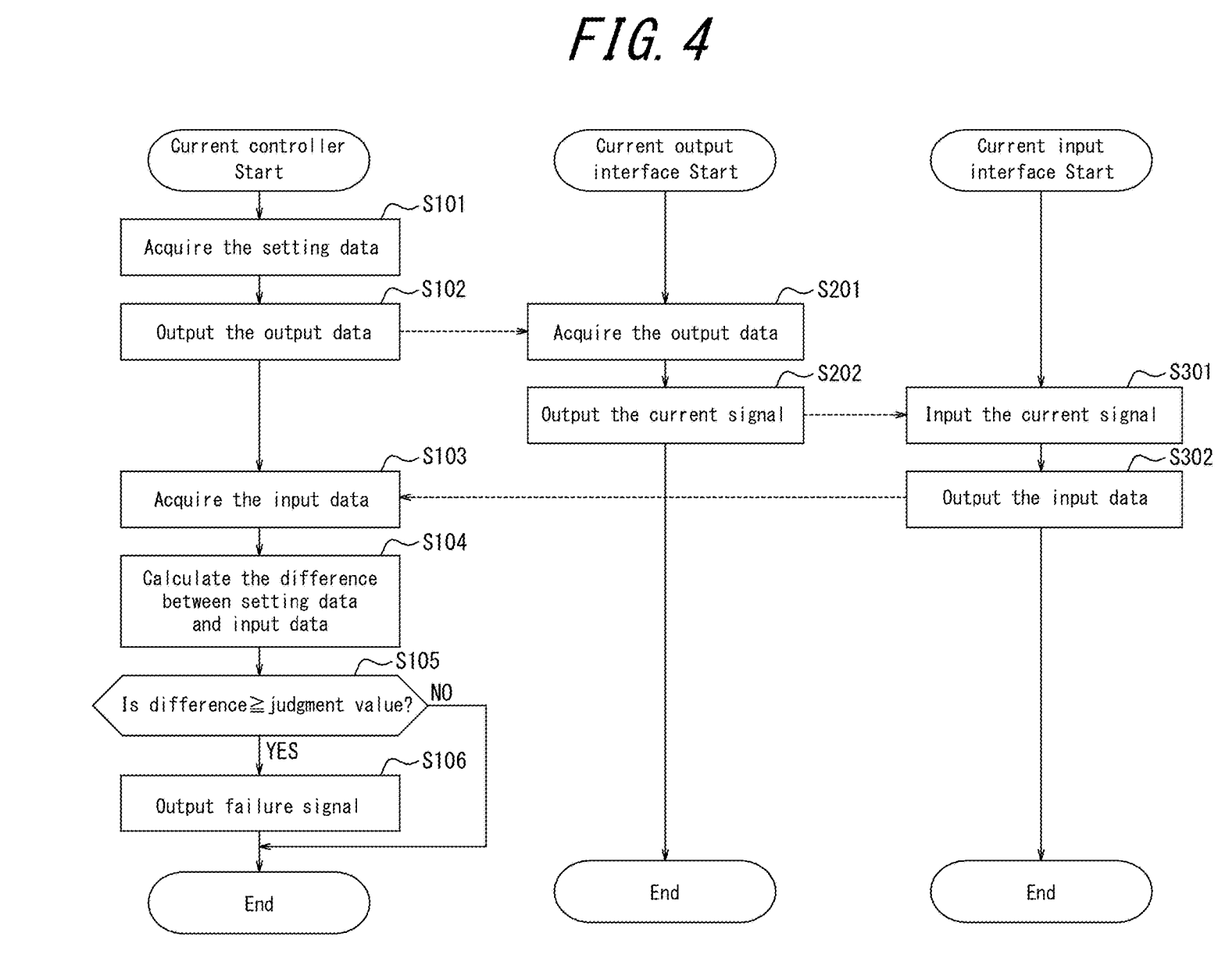
FIG. 4 is a flowchart illustrating a sequence of procedures executed by the current controller to judge whether failure has occurred.

The transmitter 1 can judge whether an abnormality, failure, or the like has occurred by following the example procedures in the flowchart of FIG. 4.

The current controller 20 acquires the setting data from the processor 10 (step S101).

The current controller 20 generates output data on the basis of the setting data and outputs the output data to the current output interface 30 (step S102). The current controller 20 may output the setting data as is as the output data. The current controller 20 may calibrate the setting data and output the result of calibration as the output data. The current output interface 30 acquires the output data from the current controller 20 (step S201). The dashed arrow pointing from step S102 to step S201 indicates the flow of the output data.

The current output interface 30 generates a first current signal based on output data and outputs the first current signal (step S202). The current output interface 30 ends the procedures of the flowchart in FIG. 4 after step S202. The current input interface 40 receives input of the first current signal from the current output interface 30 as the second current signal (step S301). The current input interface 40 is assumed to receive input of the first current signal with the configuration illustrated in FIG. 2 or FIG. 3. The dashed arrow pointing from step S202 to step S301 indicates the flow of the current signal.

The current input interface 40 generates input data on the basis of the inputted first current signal and outputs the input data to the current controller 20 (step S302). The current output interface 30 ends the procedures of the flowchart in FIG. 4 after step S302. The current controller 20 acquires the input data from the current input interface 40 (step S103). The dashed arrow pointing from step S302 to step S103 indicates the flow of input data. The current controller 20 may calibrate the input data or may use the uncalibrated input data as is.

The current controller 20 calculates the difference between the setting data and the input data (step S104).

The current controller 20 judges whether the difference between the setting data and the input data is equal to or greater than the failure judgment value (step S105).

When judging that the difference between the setting data and the input data is equal to or greater than the failure judgment value (step S105: YES), the current controller 20 outputs the failure signal (step S106).

When judging that the difference between the setting data and the input data is not equal to or greater than the failure judgment value (step S105: NO), the current controller 20 skips the procedure in step S106 and ends the procedures in the flowchart of FIG. 4. In other words, the current controller 20 does not output the failure signal when the difference between the setting data and the input data is less than the failure judgment value.

In the example procedures illustrated in the flowchart of FIG. 4, the current controller 20 calibrates the output data and the input data. The output data may, however, be calibrated in the current output interface 30. In other words, the setting data may be output as is to the current output interface 30 as the output data and be calibrated by the current output interface 30. The current output interface 30 may then output the current signal on the basis of the result of calibrating the output data. The input data may be calibrated in the current input interface 40. In other words, the input data may be generated and also calibrated by the current input interface 40 before being output to the current controller 20. The current controller 20 may acquire the calibrated input data from the current input interface 40 and output the calibrated input data as is to the processor 10. When the current output interface 30 and the current input interface 40 calibrate data, the circuit related to calibration can be omitted from the current controller 20. This can reduce the scale of the circuits for implementing the functions of the current controller 20.

Figure 5:
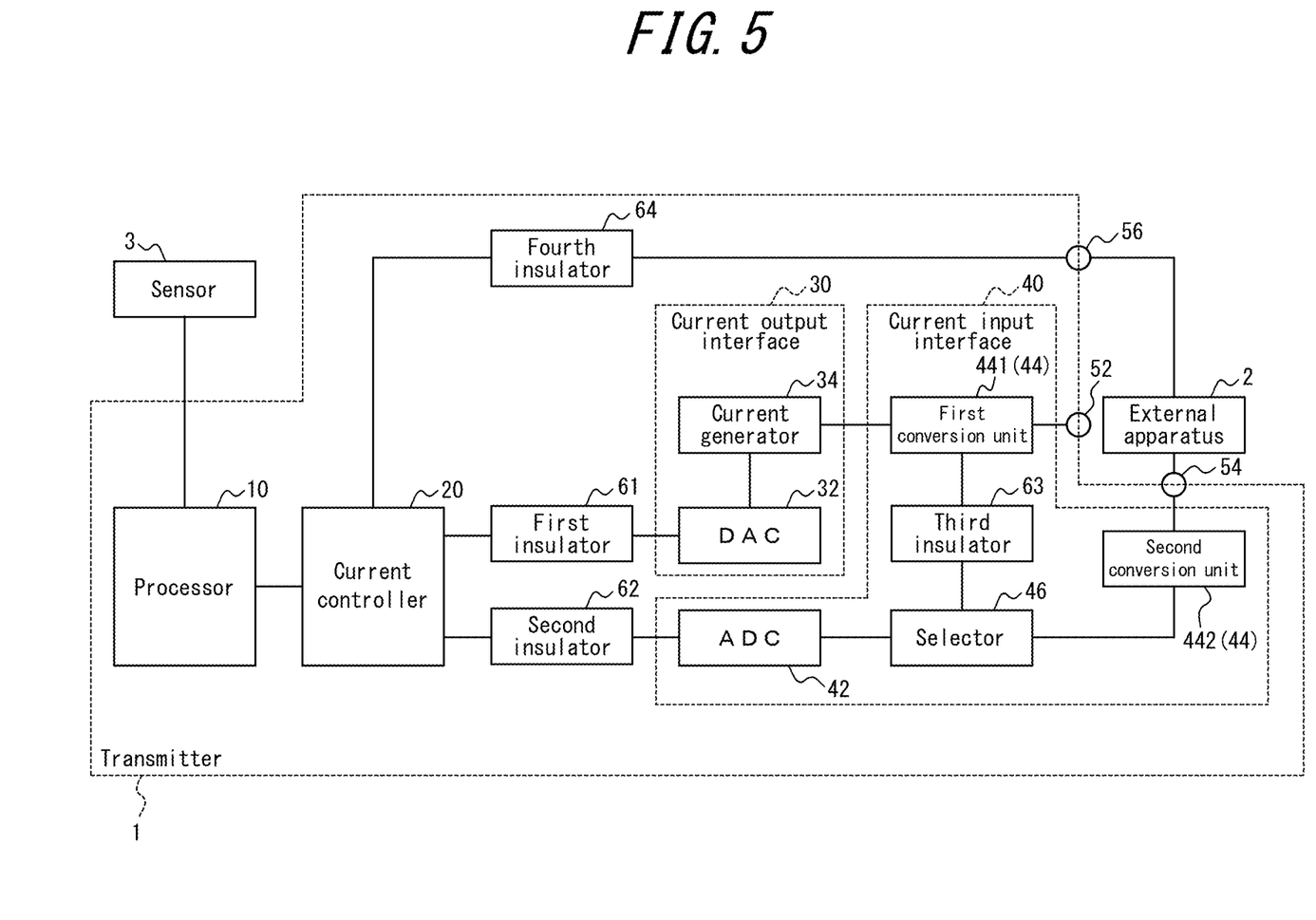
FIG. 5 is a block diagram illustrating an example configuration of a transmitter that includes an insulator.

As illustrated in FIG. 5, the transmitter 1 may further include a first insulator 61 connected between the current controller 20 and the current output interface 30. The transmitter 1 may further include a second insulator 62 connected between the current controller 20 and the current input interface 40. The transmitter 1 may further include a third insulator 63 connected between the first conversion unit 441 and the selector 46. The transmitter 1 may further include a fourth insulator 64 connected between the current controller 20 and the notification terminal 56. The first insulator 61, second insulator 62, third insulator 63, and fourth insulator 64 are also referred to collectively as an insulator. The insulator can electrically insulate the connected components from each other. The insulator may, for example, be a photo coupler.

The third insulator 63 is connected between the conversion unit 44 and the ADC 42 in the configuration illustrated in FIG. 2. The third insulator 63 may be formed by an isolation amplifier or the like.

The fourth insulator 64 may be formed by a relay or the like. When the fourth insulator 64 is a relay, the current controller 20 and the external apparatus 2 can be insulated by the relay being in the open state.

The current controller 20 becomes less affected by noise of current signals or voltage signals by virtue of being insulated from the configuration for outputting or acquiring current signals. Consequently, the reliability and noise resistance of the current controller 20 can be improved, and the reliability or safety of the transmitter 1 overall can also be improved.

The current controller 20 may output data with error detection means attached thereto when outputting the output data to the current output interface 30. The current controller 20 may acquire data with error detection means attached thereto when acquiring the input data from the current input interface 40. The error detection means may be an error detection code such as a cyclic redundancy check (CRC) code or a parity code.

The current output interface 30 may include a circuit for implementing the function of processing data to which error detection means has been attached in order to decode the output data. The current output interface 30 may detect an error in the output data on the basis of an error detection code attached to the output data. When the current output interface 30 detects an error in the output data, the current output interface 30 may issue a request to the current controller 20 to output corrected output data again. In response to the request from the current output interface 30, the current controller 20 may output corrected output data again. When the current output interface 30 includes the DAC 32, the DAC 32 may have a function to process data to which error detection means is attached.

The current input interface 40 may include a circuit for implementing a function to generate data with error detection means attached thereto. The current controller 20 may detect an error in the input data on the basis of an error detection code attached to the input data. When the current controller 20 detects an error in the input data, the current controller 20 may issue a request to the current input interface 40 to output corrected input data again. In response to the request from the current controller 20, the current input interface 40 may output corrected input data again. When the current input interface 40 includes the ADC 42, the ADC 42 may have a function to process data to which error detection means is attached.

The reliability or safety of data that is inputted and outputted can be increased by the attachment of error detection means to the data that is inputted and outputted between the current controller 20 on the one hand and the current output interface 30 and current input interface 40 on the other. This configuration can more accurately judge whether an abnormality, failure, or the like has occurred in the transmitter 1 on the basis of a comparison between the setting data and the input data. Consequently, the reliability or safety of the transmitter 1 overall can be improved. The transmitter 1 can more easily satisfy the SIL requirements by having improved reliability or safety. In other words, the transmitter 1 can more easily acquire the SIL.

The processing related to the error detection means may include particular processing, such as pattern-based calculation. The current controller 20 may be configured by an FPGA or the like specialized for particular processing and may thereby be capable of executing processing related to the error detection means more efficiently than the processor 10. The load of the processor 10 can be reduced by having the current controller 20 execute the processing related to the error detection means. For example, the load for data correction in the processor 10 can be reduced by enabling the exchange of corrected data between the current controller 20 on the one hand and the current output interface 30 or the current input interface 40 on the other. The transmitter 1 can therefore operate more efficiently overall.

Although embodiments of the present disclosure have been described through drawings and examples, it is to be noted that various changes and modifications will be apparent to those skilled in the art on the basis of the present disclosure. Therefore, such changes and modifications are to be understood as included within the scope of the present disclosure. For example, the functions or the like included in the various components or steps may be reordered in any logically consistent way. Furthermore, components or steps may be combined into one or divided.

The invention claimed is:

1. A transmitter comprising:
a processor configured to connect to a sensor that outputs measurement data and configured to output setting data based on the measurement data;
a current controller configured to output output data based on the setting data from the processor;
a current output interface configured to output a first current signal based on the output data from the current controller to an external apparatus, when connecting to the external apparatus; and
a current input interface configured to receive input of a second current signal, the second current signal being different from the first current signal, outputted by the external apparatus when connecting to the external apparatus and to output input data based on the second current signal to the current controller;
wherein the current input interface is configured to receive the first current signal outputted by the current output interface, when connecting to the current output interface via a connection circuit, as the second current signal and to output internal input data based on the first current signal to the current controller as the input data; and
wherein the current controller is configured to detect failure of the transmitter in accordance with a comparison between the setting data and the internal input data.

2. The transmitter of claim 1, wherein the output data and the input data are outputted with an error detection code attached thereto.

3. The transmitter of claim 2, wherein the current controller is configured to output the output data again to the current output interface when the current output interface detects an error in the output data in accordance with the error detection code.

4. The transmitter of claim 2, wherein the current controller is configured to issue a request to the current input interface to output the input data again when the current controller detects an error in the input data in accordance with the error detection code.

5. The transmitter of claim 3, wherein the current controller is configured to issue a request to the current input interface to output the input data again when the current controller detects an error in the input data in accordance with the error detection code.

6. The transmitter of claim 1,
wherein the transmitter is configured to connect to an external apparatus;
wherein the current output interface is configured to output the first current signal to the external apparatus; and
wherein the current input interface comprises a selector configured to select one of the internal input data and external input data that is based on a current signal inputted from the external apparatus, and the current input interface is configured to output the one of the internal input data and the external input data selected by the selector to the current controller as the input data.

7. The transmitter of claim 2,
wherein the transmitter is configured to connect to an external apparatus;
wherein the current output interface is configured to output the first current signal to the external apparatus; and
wherein the current input interface comprises a selector configured to select one of the internal input data and external input data that is based on a current signal inputted from the external apparatus, and the current input interface is configured to output the one of the internal input data and the external input data selected by the selector to the current controller as the input data.

8. The transmitter of claim 3,
wherein the transmitter is configured to connect to an external apparatus;
wherein the current output interface is configured to output the first current signal to the external apparatus; and
wherein the current input interface comprises a selector configured to select one of the internal input data and external input data that is based on a current signal inputted from the external apparatus, and the current input interface is configured to output the one of the internal input data and the external input data selected by the selector to the current controller as the input data.

9. The transmitter of claim 4,
wherein the transmitter is configured to connect to an external apparatus;
wherein the current output interface is configured to output the first current signal to the external apparatus; and
wherein the current input interface comprises a selector configured to select one of the internal input data and external input data that is based on a current signal inputted from the external apparatus, and the current input interface is configured to output the one of the internal input data and the external input data selected by the selector to the current controller as the input data.

10. The transmitter of claim 5,
wherein the transmitter is configured to connect to an external apparatus;
wherein the current output interface is configured to output the first current signal to the external apparatus; and
wherein the current input interface comprises a selector configured to select one of the internal input data and external input data that is based on a current signal inputted from the external apparatus, and the current input interface is configured to output the one of the internal input data and the external input data selected by the selector to the current controller as the input data.

11. The transmitter of claim 1, wherein when the output data and the input data have different numbers of bits, the current controller is configured to align a most significant bit of the output data and a most significant bit of the input data and convert the output data and the input data to an identical number of bits.

12. The transmitter of claim 1, wherein the current controller is configured to output a failure signal when detecting failure of the transmitter.

13. The transmitter of claim 12, wherein the current output interface is configured to output a current signal including at least one of a current with a magnitude equal to or less than a first predetermined value and a current with a magnitude equal to or greater than a second predetermined value as the first current signal in accordance with the failure signal.

\* \* \* \* \*